(12) United States Patent
Tuominen et al.

(10) Patent No.: US 7,078,666 B2
(45) Date of Patent: Jul. 18, 2006

(54) WIRELESS POWER AND DATA TRANSMISSION

(75) Inventors: Juha Tuominen, Pirkkala (FI); Kai Hämäläinen, Tampere (FI)

(73) Assignee: Ailocom Oy, Tampere (FI)

( * ) Notice: Subject to any disclaimer, the term of this patent is extended or adjusted under 35 U.S.C. 154(b) by 109 days.

(21) Appl. No.: 10/820,173

(22) Filed: Apr. 7, 2004

(65) Prior Publication Data

US 2004/0266367 A1    Dec. 30, 2004

(30) Foreign Application Priority Data

Apr. 17, 2003  (FI) ................................. 20030594

(51) Int. Cl.
*G01J 1/32* (2006.01)

(52) U.S. Cl. ...................... 250/205; 322/2 R; 398/118; 136/243; 455/69

(58) Field of Classification Search ................ 250/205, 250/214 R, 221; 322/2 R; 398/118; 136/243; 455/39, 68, 69, 117; 340/333; 60/641.8
See application file for complete search history.

(56) References Cited

U.S. PATENT DOCUMENTS

| | | | |
|---|---|---|---|
| 4,078,747 A | | 3/1978 | Minovitch .................. 244/159 |
| 4,091,734 A | | 5/1978 | Redmond et al. |
| 4,187,506 A | * | 2/1980 | Frosch et al. ................ 342/352 |
| 5,229,593 A | | 7/1993 | Cato |
| 5,260,639 A | * | 11/1993 | De Young et al. .......... 322/2 R |
| 5,771,114 A | | 6/1998 | Andersson et al. |
| 5,837,996 A | | 11/1998 | Keydar |
| 6,364,253 B1 | | 4/2002 | Cavanagh .................... 244/190 |
| 6,407,535 B1 | * | 6/2002 | Friedman et al. ............ 322/2 R |
| 6,433,683 B1 | | 8/2002 | Robinson .................... 340/540 |
| 6,534,705 B1 | * | 3/2003 | Berrios et al. ............... 136/243 |

FOREIGN PATENT DOCUMENTS

| | | |
|---|---|---|
| EP | 0 734 110 | 9/1996 |
| FI | 111670 B | 4/2003 |
| JP | 11134566 A * | 5/1999 |
| WO | 01/50179 A1 | 7/2001 |
| WO | 03/036778 | 5/2003 |

OTHER PUBLICATIONS esp@cenet English Abstract of FI 111670 of Apr. 2003.
esp@cenet English Abstract of EP 0 734 110 of Sep. 1996.
ANSI A 136.1, "Ton-Term Exposure Limits," *Excerpts from the OSHA Technical Manual, Chapter 6: Laser Hazards*, 1993, pp 1-5.

* cited by examiner

*Primary Examiner*—David Porta
*Assistant Examiner*—Stephen Yam
(74) *Attorney, Agent, or Firm*—Ladas & Parry LLP

(57) ABSTRACT

A method of transmitting data in a wireless power transmission system comprising a power transmitter including a first and a second light source and means for directing the emitted light. The second light source is used for transmitting, parallel and as low-intensity pulses, light arranged around the light emitted by the first light source, data bits being encoded in the pulses so as to determine a maximum time interval between two successive pulses. At least one power receiver of the system comprises a first and a second photo-detector for receiving the emitted light and for converting it into electric current. The second photo-detector is used for indicating light pulses and data included therein and time between successive light pulses. A control signal indicating disturbance-free reception of data is transmitted to the transmitter if the time between successive light pulses does not exceed a predetermined maximum time interval.

12 Claims, 3 Drawing Sheets

WIRELESS POWER AND DATA TRANSMISSION

FIELD OF THE INVENTION

The invention relates to combined wireless power and data transmission, and particularly to the utilization of light sources therein.

BACKGROUND OF THE INVENTION

It is known to use wireless power transmission in situations where physical wiring or cabling between a power source and a power consumption point is difficult, if not impossible, to implement. Electromechanical devices conventionally employ inductive elements for power transmission e.g. between rotating or otherwise separated components. Inductive power transmission is also used for recharging low-power batteries, for example. In inductive power transmission, the power source and the power consumption or recharging point must be located close to each other, and it is often necessary to isolate them galvanically from the environment, because the electromagnetic radiation caused by induction may interfere with the operation of adjacent devices.

Solutions are also known wherein power transmission is carried out as radio frequency transmission from a transmitter to one or more receivers, such as radio-frequency identification and key cards. Such a solution is only suitable for power transmission of a very low level, because it is difficult to direct the total power to be used for the transmission at specific receiving antennas, and in practice transmission losses are extremely large. In addition, the efficiency of radio frequency power transmission degrades rapidly as a function of distance.

A possibility to carry out wireless power transmission is to use a light source as the power transmitter, the transmitted light then being received by a photo-detector and converted into electric current. A light source is easier to direct towards a receiver, and this enables a better efficiency than that achieved e.g. in radio frequency power transmission to be achieved. Publications EP 734 110 and U.S. Pat. No. 4,078,747, for example, describe solutions wherein high power lasers are used for wireless transmission of high currents in the power supply of electric trains and, similarly, for transferring solar energy generated in space.

A problem with the above-described solutions is that they are not suitable for efficient wireless power transmission in environments occupied by people since the intensity of the laser to be used is substantially life-threatening. Even if significantly reduced, the power levels required for a sufficiently good efficiency would be so high that the laser would at least severely damage vision in case of ocular exposure. The aforementioned safety problems further present the disadvantage that although optical data transmission is known per se, such transmission is difficult to implement wirelessly in a safe manner; therefore, an optical fibre is typically used for optical data transmission.

BRIEF DESCRIPTION OF THE INVENTION

It is therefore an object of the invention to provide an improved method and equipment implementing the method so as to enable the aforementioned problems to be solved. The objects of the invention are achieved by a method, a system, a transmitter and a receiver which are characterized by what is disclosed in the independent claims.

Preferred embodiments of the invention are disclosed in the dependent claims.

The idea underlying the invention is that data is transmitted in a wireless power transmission system comprising a power transmitter which comprises a first light source, means for directing light emitted by the first light source in a desired direction, and at least one power receiver comprising a first photo-detector for receiving the emitted light and converting it into electric current. In order to transmit data, a second light source included in the power transmitter is for transmitting, substantially parallelly and as pulses, light arranged around the light emitted by the first light source, the intensity of the pulses being substantially lower than the intensity of the light emitted by the first light source and data bits being encoded in the pulses so as to determine a maximum time interval between two successive pulses. A second photo-detector included in the power receiver is for indicating light pulses emitted by the second light source, and for determining data included in the light pulses and time between successive received light pulses. If the time between successive received light pulses does not exceed the maximum time interval determined for two successive pulses, a control signal indicating disturbance-free reception of data is transmitted as an acknowledgement from the power receiver to the power transmitter.

According to a preferred embodiment of the invention, the control signal is transmitted from the power receiver to the power transmitter at regular intervals from the reception of the light pulses emitted by the second light source such that in response to detecting a disturbance in the light pulses emitted by the second light source, the transmission of the control signal is stopped.

Furthermore, according to a preferred embodiment of the invention, the second light source comprises a plural number of separate light sources arranged substantially circularly around the first light source, the power receiver being used for indicating light pulses emitted by the plurality of separate light sources as logical binary values, and, in response to the binary value of a light pulse emitted by at least one of the separate light sources deviating from the simultaneous binary values of the other light pulses, stopping the transmission of the control signal.

An advantage of the method and system of the invention is that a system configured for wireless power transmission is preferably utilized also for one-way transmission of data from a power transmitter to a power receiver. A further advantage is that no separate transmission path, e.g. a radio link, is needed for data transmission but the same light pulse as is used for providing a "virtual insulator" of the power transmitter is also utilized for data transmission. Yet another advantage is that data transmission by means of such a virtual insulator requires no simultaneous power transmission from the first light source (power source) of the transmitter, but the data transmission may be carried out by activating the virtual insulator only. An advantage is, however, that data transmission by means of a virtual insulator may also be carried out simultaneously with power transmission.

BRIEF DESCRIPTION OF THE DRAWINGS

The invention is now described in greater detail in connection with the preferred embodiments and with reference to the accompanying drawings, in which.

DETAILED DESCRIPTION OF THE INVENTION

Figure 1:
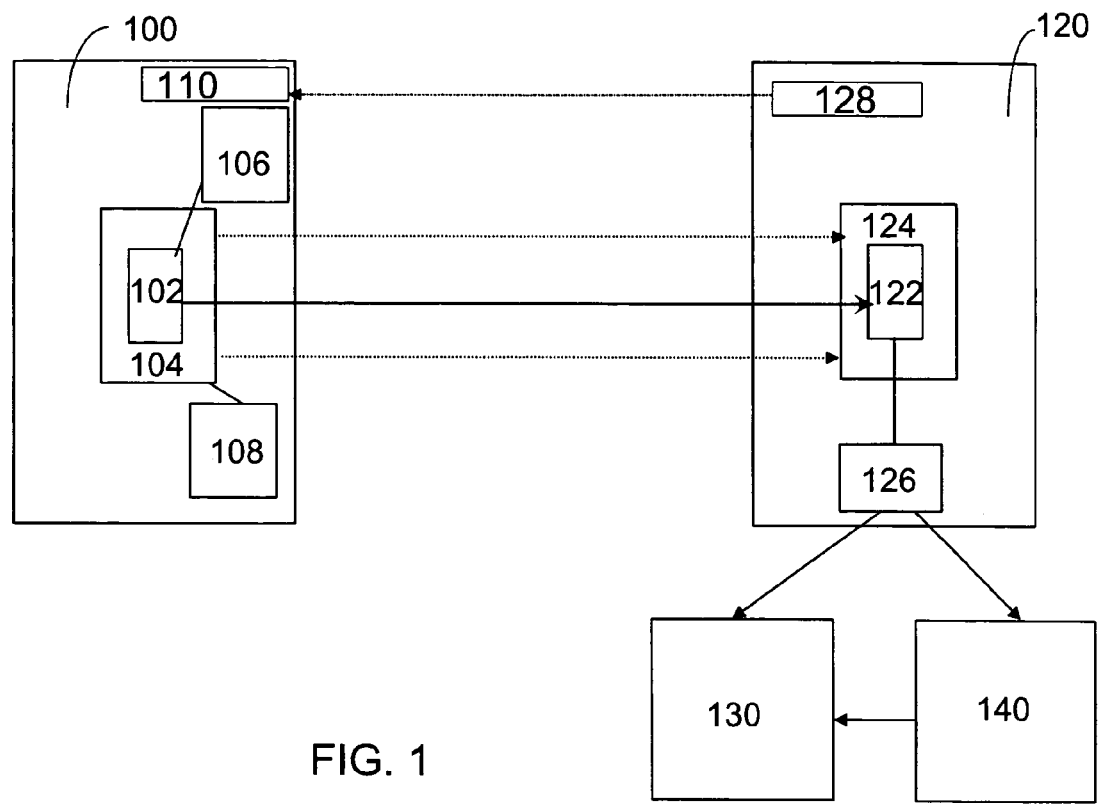
FIG. 1 is a block diagram showing a basic structure of a system of the invention.

With reference to FIG. 1, a basic structure of the system will be described. The system comprises a transmitter 100, a receiver 120 connected to an external power-consuming device 130, and charging means 140, typically a battery, for storing electric energy. The transmitter 100 further comprises a first light source 102, a second light source 104 of substantially lower intensity, directing means 106 for directing at least the light emitted by the first light source 102 at the receiver, and scanning means 108 for deflecting at least the light emitted by the second light source 104 in different directions in order to locate receivers. The transmitter further comprises a receiver 110 for receiving a control signal. The receiver 120 comprises a first photo-detector 122 for receiving the light intensity emitted by the first light source 102, a second photo-detector 124 for receiving the light intensity emitted by the second light source 104, and conducting means 126 for conducting electric current generated from the received light intensity by the first photo-detector to the external device 130 and to the charging means 140. The receiver further comprises a transmitter 128 for transmitting a control signal to the transmitter 100.

A power transmission process in the system basically operates in the following manner: the transmitter 100 switches on the second light source 104 whose transmission power is substantially low enough not to cause danger to the eyes, for example. If the transmitter 100 has not been directed at the receiver 120 in advance, the directing is carried out by means of the second light source 104 and the scanning means 108. The second light source 104 preferably comprises a plural number of separate low power light sources arranged circularly around the first light source 102. The light emitted by the second light source, i.e. a set of multiple light sources, can be called a virtual insulator. Alternatively, a virtual insulator can be provided using a single light source, and the light emitted by the single light source is expanded by a beam expander so as to spread it circularly around the first light source 102.

In order to direct the transmitter at the receiver, the transmitter activates the virtual insulator and starts to scan the environment of the transmitter at the location where it has been placed. The scanning is preferably carried out as a predetermined, two- or three-dimensional systematic path, which is followed to cover the space around the transmitter until the virtual insulator comes into contact with the receiver. The second photo-detector 124 of the receiver is arranged to receive light at a wavelength corresponding to the one at which the virtual insulator is transmitted. When the virtual insulator comes into contact with the second photo-detector of the receiver, the virtual insulator is focused on the photo-detector in a manner to be described in greater detail below.

When the virtual insulator has been focused on the second photo-detector of the receiver, the first light source 102 can be switched on in the transmitter, the light emitted by the first light source being thus transmitted surrounded by the virtual insulator and the light intensity of the first light source carrying out the actual power transmission. The first photo-detector 122 of the receiver, in turn, is correspondingly arranged to receive the light at substantially the same wavelength as transmitted by the first light source. The first photo-detector 122 converts the received light power into electric current, which is further conducted through the conductor means 126 to the external device 130 and/or the battery 140. Compared with known solutions, the process of the invention enables a significantly better efficiency to be achieved in power transmission. Current light sources and photo-detectors enable efficiency of substantially at least 20% to be achieved.

Since the system is meant to be used for example for supplying power to common office equipment and entertainment electronics devices, it is thus also used in places where people and pets, for example, are present. When light is generated in the first light source 102 by using high power, the light thus generated may be hazardous to the eyes, for example, even if the light did not reside at a visible wavelength. To prevent this, the system employs the above-described virtual insulator to insulate the light beam intended for the actual power transmission, and to inform the system if the insulation 'breaks', i.e. its path is blocked by an obstacle. In such a case, the power supply of the first light source is switched off immediately. After the obstacle blocking the path of the virtual insulator has been removed, the power supply process can be restarted by checking first that the virtual insulator is directed at the receiver, and, if the virtual insulator operates properly, subsequently activating the light beam to be used for the actual power transmission.

Figure 2:
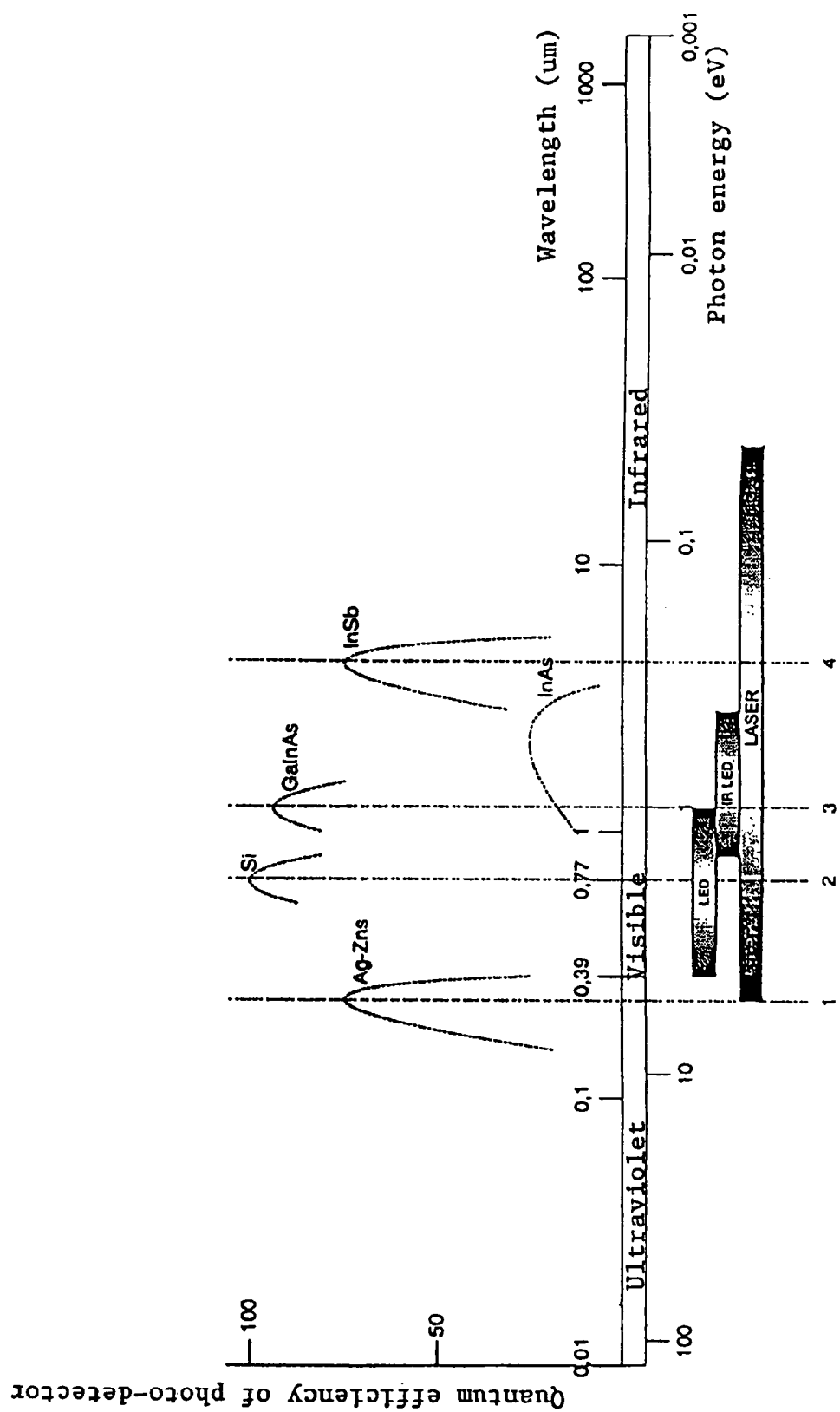
FIG. 2 is a schematic view showing characteristics of some light sources and photo-detectors utilized in the invention.

The light sources to be used in the system may include e.g. a light emitting diode LED or a laser. The light source to be used and the wavelength thereof, in turn, must be adjusted to the photo-detector to be used. This is illustrated in the diagram of FIG. 2, which shows the quantum efficiency of photo-detectors made of different materials, i.e. the efficiency of reception at different wavelengths of light. The vertical axis shows the quantum efficiency while the horizontal axis shows the wavelength of light and the corresponding photon energy transmitted at a particular wavelength, the photon energy being inversely proportional to the wavelength. In addition, FIG. 2 shows the wavelength ranges of some light sources currently used.

FIG. 2 also shows that if a maximum amount of power is to be transmitted, a wavelength as short as possible is preferably used since the amount of transmitted photon energy then increases correspondingly. On the other hand, in order to enable the transmitted power also to be utilized, the photo-detector to be used must be adjusted to the corresponding wavelength. If a wavelength as long as possible, i.e. photon energy as high as possible, is to be used, the light source can be implemented using a laser whose wavelength is substantially 0.30 um; this, in turn, enables an Ag—Zns photo-detector of a fairly good quantum efficiency to be used. Correspondingly, if the quantum efficiency is to be maximized, an Si-photo-detector operating in a range of approximately 0.8 um can be used, in which case the light source may be a LED, laser or possibly a LED operating in the infrared range. The invention may also utilize the other materials mentioned in FIG. 2 as the photo-detector. It is to be noted that this disclosure only describes, by way of example, currently preferred light sources and photo-detectors applicable to the invention. However, the implementation of the invention is not restricted to the laser and/or photo-detector to be used, nor to the wavelengths utilized by them but, as technology advances, both the light source and the photo-detector can be implemented using components made of other materials and employing other wavelengths.

When lasers are used, the light to be transmitted, i.e. the light of both the virtual insulator and the power source, can be directed directly at the desired power consumption point. The light source can then be directed e.g. as a laser deflection controlled by a microcircuit, the lasers themselves being directed directly at the receiver. If, on the other hand, the light sources are light emitting diodes LED, for example, the directing can be carried out using mirrors to provide what is known as a mirror-controlled deflection. In such a case, the light source is preferably directed using a sufficient number of mirror servos controlled by a separate control unit. The laser deflection can also be carried out as a mirror-controlled deflection.

Figure 3:
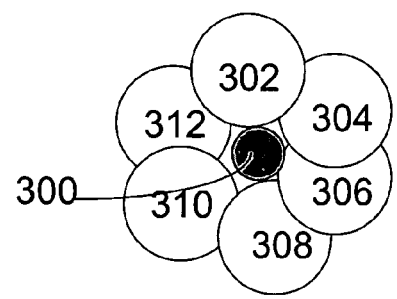
FIG. 3 shows a light beam arrangement according to an embodiment of the invention.

In the directing of the virtual insulator in particular, it is always possible to use a beam expander to expand a narrow beam of a light source to produce a wider, parallel beam. The beam expander comprises two lenses arranged in connection with the transmitter, the first lens spreading the light beam coming from the light source. The second lens is arranged in the vicinity of the first one to collect the light beam spread by the first lens and to refract it to provide a parallel beam. A light beam coming from a light source and having a diameter of 1 mm, for example, can thus be converted into a light beam having a diameter of 5 mm, which is easier to direct at the photo-detectors of the receiver. The virtual insulator can thus be formed using a plural number of light sources, perhaps 5 to 7 light sources, each being expanded by means of the beam expander to form a round light curtain of at least partly overlapping light beams. The number of light sources thus suffices to ensure that the virtual insulator works in a safe manner such that an object approaching a power transmission beam from any direction sufficiently early causes a security link to break and the following power transmission beam to be extinguished. This is illustrated in FIG. 3b, in which a power beam 312 is surrounded by a plural number of expanded, curtain-like virtual insulator beams 314 to 324.

The virtual insulator is preferably implemented using relatively low-power lasers that operate at a different wavelength than the actual power source. Such lasers are affordable, and the light they produce is already coherent so that no separate directing means are needed and the light, which is emitted at a different wavelength, does not cause error situations in the photo-detector of the actual power transmission light. The virtual insulator may preferably be transmitted as light pulses, using pulse lasers operating at an extremely high frequency, such as 10 to 100 MHz. The control of the operation of the virtual insulator is preferably based on a control signal transmitted at regular intervals by the receiver to the transmitter if the virtual insulator functions appropriately. If the reception of the control signal at the transmitter stops, the power supply of the first light source is also switched off immediately. Control means connected to a control signal receiver 110 monitor the reception of the control signal. Then, if the reception of the control signal at the receiver is delayed more than what has been predetermined (i.e. one control signal is missed), the control means stop the power supply of the light source immediately.

According to the invention, the light pulses of the virtual insulator may also be utilized for data transmission from the transmitter 100 to the receiver 120. In such a case, the wave length and power density of the light to be generated in the first light source 102 (power source) should also be selected so as to enable a brief contact of a light beam with the eye without the light beam damaging the eye. The allowable duration of contact between the transmitted light beam and the eye which is considered to be safe for the eye, also called a maximum permissible exposure MPE, affects the frequency at which the photo-detector of the virtual insulator is to receive a light pulse to enable the integrity of the virtual insulator to be confirmed safely. The maximum permissible exposure, in turn, is a function of the wavelength of the light beam used for power transmission and the power density ($W/cm^2$). The standard ANSI 136.1, of which some exemplary values are disclosed in Appendices 1 and 2, determines these values in greater detail.

The smallest permissible reception frequency f of light pulses is determined on the basis of the maximum permissible exposure MPE such that the delay D between the moment of detecting that the virtual insulator is broken and the moment of the power supply of the light source 102 being stopped is simultaneously taken into account. Consequently, $f=1/(MPE-D)$, which gives the longest permissible time T between two light pulses of the virtual insulator: $T=1/f=MPE-D$.

This can be utilized in data transmission by means of the virtual insulator. The data to be transmitted is to be encoded using an encoding method enabling a rising or a falling edge of a pulse-encoded bit to be detected and the duration in time of one bit to be determined in order to find out the maximum pause between two successive edges. One suitable encoding method is what is known as Manchester coding, wherein bit values are determined such that a transfer from zero to one (rising edge) or from one to zero (falling edge) takes place in the middle of each bit sequence. The length of a bit sequence is predetermined and sampling takes place in the middle of the bit sequence, which is also when the transfer takes place. A rising edge detected during sampling gives 1 as the bit value while a falling edge gives 0 as the bit value. During each bit sequence, a pulse representing a value 1 and a pulse representing a value 0 are thus detected, the mutual order thereof determining the value of the bit.

Consequently, the data to be transmitted by means of the virtual insulator may be encoded such that a value 1 is encoded to a pulsed signal by transmitting a light pulse whose duration is half the duration of the bit sequence, and a value 0 by interrupting the transmission of light during a half of the bit sequence. In such a case, the maximum pause between two light pulses corresponds to the length of one bit sequence at most; this is the case when a bit value 0 is followed by a bit value 1, i.e. a light pulse is transmitted during the first half of a 0 bit and the latter half of a 1 bit. In a practical implementation, this maximum pause thus corresponds to the above-determined longest permissible time T between two light pulses of the virtual insulator, being determined on the basis of the characteristics of the system and thus setting a limit value for the duration of a bit sequence of a data signal.

The control signal may be controlled e.g. based on determining the detected light pulses of the virtual insulator as a logical 1 while the time intervals during which no light is received are determined as a logical 0. The photo-detector of the virtual insulator is preferably arranged to carry out a logical AND operation on the received light pulses. The virtual insulator is then interpreted to be intact if the result of the AND operation is 1, i.e. all virtual insulator beams transmit simultaneously the same logical value, and the time elapsed from the reception of the previous logical value 1, i.e. a light pulse, corresponds to the length of one bit sequence at most. If these conditions are not met, the reception of at least one virtual insulator beam has been unsuccessful. This probably means that there is an object blocking the path of the light emitted by at least one light source in the virtual insulator. The transmission of the control signal from the receiver is then stopped immediately. Since the delay in the system between the moment of detecting that the virtual insulator is broken and the moment of the transmission of the control signal being stopped has already been taken into account in the coding rate of the bit sequence, a potential contact between the power beam and the eye is far too brief to damage the eye.

The virtual insulator may thus also be utilized in one-way data transmission from the transmitter to the receiver so that no separate transmission path, e.g. a radio link, is needed to transmit data. Particularly, the virtual insulator may be used for transmitting non-real-time data, such as different files or streaming video to be buffered, to a device connected to the receiver. It is to be noted that data transmission by means of the virtual insulator does not require simultaneous power transmission from the first light source (power source) of the transmitter, but data transmission may be carried out by activating the virtual insulator only. Naturally, data transmission by means of a virtual insulator may also be carried out simultaneously with power transmission.

The control signal can be transmitted e.g. using an omnidirectional LED of a relatively weak intensity, which operates in the infrared range. This kind of LED is inexpensive, and since it is omnidirectional, the mutual position of the transmitter and the receiver is not essentially significant for the reception of the control signal at the transmitter. Alternatively, the control signal can be transmitted using a low-power radio transmitter, for example. The control signal controlling the transmission of the power beam can be referred to as a security link.

A virtual insulator may be used in order to find and direct receivers, as was disclosed above. In order to direct a transmitter at a receiver, the transmitter activates the virtual insulator and starts to scan the environment of the location where the transmitter is placed. Meanwhile, the receivers located therein and the devices themselves that are connected to the receivers are powered by their batteries. The scanning is carried out following a predetermined path covering the entire space surrounding the transmitter until the virtual insulator comes into contact with the receiver. When the virtual insulator comes into contact with the second photo-detector of the receiver, the receiver informs the transmitter of this over the security link. Since the actual scanning is preferably carried out at a high speed, the directing can be performed such that the security link informs of an instantaneous connection made by the virtual insulator, which is naturally received at the transmitter after a short delay. This causes the transmitter to stop the scanning process and move the virtual insulator slowly backwards a distance corresponding to the distance it proceeded during the delay, until the connection is re-established. Next, the transmitter determines the location coordinates of the receiver and, when necessary, continues to search for other receivers in the space.

If new devices for which wireless transmission is to be arranged are brought into the space, the scanning process is started again from the transmitter. Alternatively, the transmitter may carry out an automated scan at predetermined intervals. The location coordinates of the new devices are determined with a similar scan, and the transmitter stores the coordinates in a memory. Since the coordinates of the devices already present in the space have already been stored in the memory of the transmitter, these devices may advantageously be ignored in new scanning rounds, which speeds up the scanning of the space.

The actual power transmission to a plural number of receiving devices takes place by supplying power to each consumption point for a predetermined period of time, after which the first light source (power source) of the transmitter is switched off and the virtual insulator is directed at the next consumption point. This may advantageously be carried out without scanning, because the coordinates of the consumption points have already been determined before and they are stored in the transmitter memory. When the virtual insulator is focused on the photo-detector of the virtual insulator of the next receiver, the receiver in question activates the security link, the transmitter being thereby informed that the focusing has been carried out successfully and that it may switch on the first light source (power source). The transmitter again supplies power for a predetermined period of time, switches off the power source and moves on to the next consumption point.

Figure 4A:
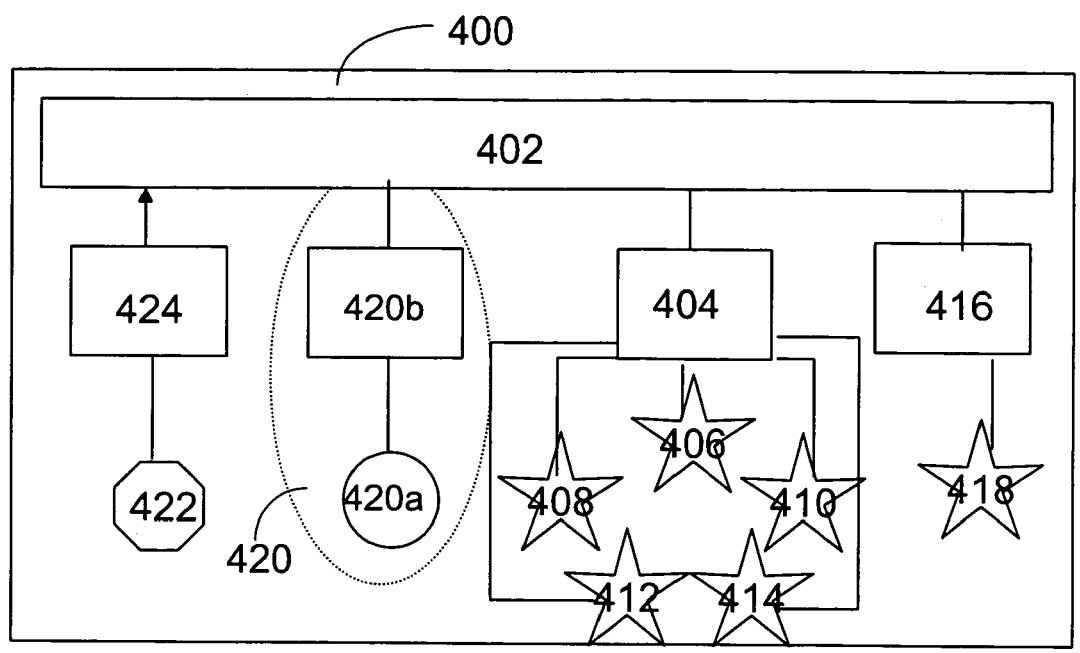
FIGS. 4a and 4b are block diagrams showing a transmitter unit and a receiver unit implemented according to an embodiment of the invention; and Appendices 1 and 2 show some values for a maximum permissible exposure to a laser beam as disclosed in Tables 5a and 5b of the standard ANSI Z136.1.
Figure 4B:
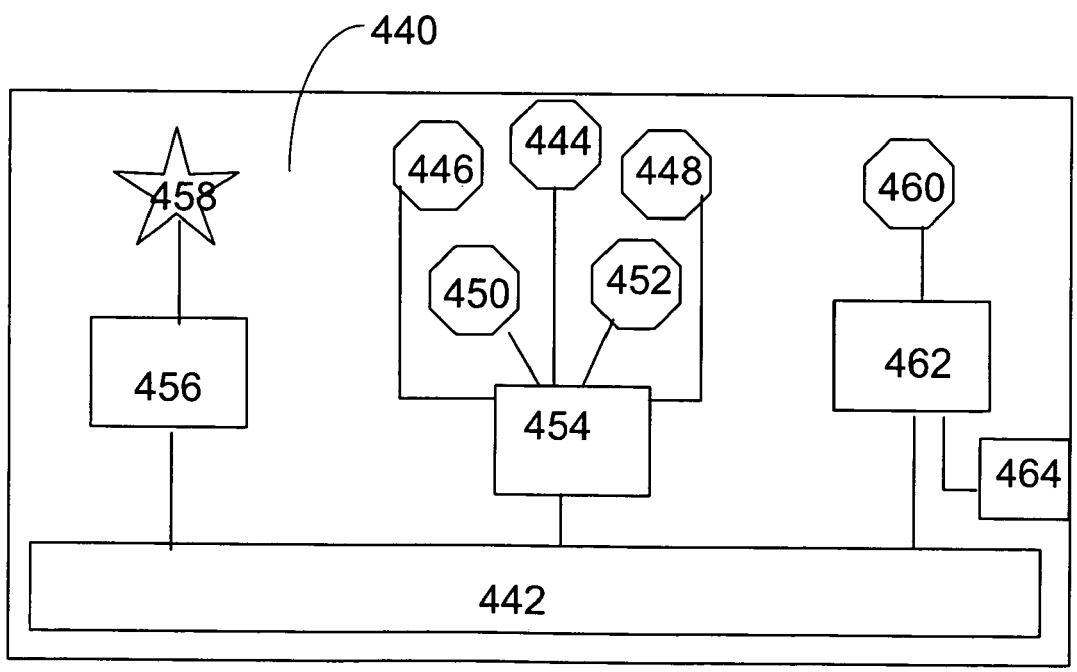

FIGS. 4a and 4b are schematic views of functional blocks of a transmitter unit 400 and a receiver unit 440 of the invention. The transmitter unit 400 comprises a transmitter control logic 402 that can be advantageously implemented for example as programmable ICs, software, or as a combination thereof. During the operation of the device, the control logic 402 controls the supply control 404 of the virtual insulator, the supply control controlling the low power lasers 406, 408, 410, 412 and 414 of the virtual insulator. The control logic also comprises functions for encoding a data signal to form virtual insulator pulses as described above. In addition, the control logic 402 controls a supply control circuit 416 of the power laser during the operation of the device, the circuit, in turn, controlling the operation of the actual power source (laser) 418. Further, the control logic 402 controls the deflection of the lasers of both the virtual insulator and the power source to a desired consumption point. The deflection is carried out by a deflection unit 420, which can be implemented for example as a laser deflection controlled by a microcircuit, in which case the lasers themselves are directed directly at the receiver, or as a mirror-controlled deflection, in which case the directing is carried out with mirrors if light emitting diodes LED, for example, are used as light sources. The deflection unit 420 then preferably comprises a sufficient number of mirror servos 420a and a control unit 420b controlling them. An essential element in the safe operation of the transmitter unit 400 is a security link receiver 422 from which a received security link signal is supplied through an amplifier 424 to the control unit 402.

FIG. 4b, in turn, shows the functional blocks of a receiver unit 440 of the invention. The receiver unit 440 also comprises a control logic 442, which can be implemented for example as programmable ICs, software or as a combination thereof. Laser pulses transmitted by low-power lasers of the transmitter unit are received from photo-detectors 444, 446, 448, 450 and 452 of the virtual insulator. The received laser pulses may also comprise data to be decoded by the control logic of the receiver. On the basis of the received pulses and the reception moments thereof, the control logic of the receiver also concludes whether the virtual insulator is intact and, if so, the logic instructs a supply circuit 456 of the security link to start transmitting the security link signal through the transmitter 458, which is preferably an infra-red LED or a low-power radio transmitter, for example. The photo-detector 460 of the power laser serves as the receiver of the actual power to be transmitted, the electric current converted from the light power received from the photo-detector being supplied through a control unit 462 of charging to an interface 464, wherefrom it may be further supplied either to an external device or charging means, such as a battery.

The power transmission system described above and the related data transmission procedure can be arranged in connection with diverse devices. For example, the receiver unit can be arranged in connection with different office equipment, such as printers, portable computers, keyboards, wireless network base stations or telephones, or in connection with different personal or entertainment electronics devices, such as radio or stereo equipment, active loudspeakers, phone chargers, etc. In addition, the system can be applied to different monitoring and alarm systems, in which wireless power transmission may be difficult to arrange. Such applications include e.g. wireless surveillance cameras, motion detectors, diverse control sensors and alarm devices. Naturally, the application of the system is not restricted to the above examples only.

It is apparent to a person skilled in the art that as technology advances, the basic idea of the invention can be implemented in various ways. The invention and its embodiments are therefore not restricted to the above examples, but they may vary within the scope of the claims.

TABLE 5a

APPENDIX 1
Maximum Permissible Exposure (MPE) for Small-Source Ocular Exposure to a Laser Beam[†]

| Wavelength (μm) | Exposure Duration, t (s) | MPE (J · cm$^{-2}$) | MPE (W · cm$^{-2}$) | Notes |
|---|---|---|---|---|
| Ultraviolet | | | | |
| 0.180 to 0.302 | $10^{-9}$ to $3 \times 10^4$ | $3 \times 10^{-3}$ | | |
| 0.303 | $10^{-9}$ to $3 \times 10^4$ | $4 \times 10^{-3}$ | | |
| 0.304 | $10^{-9}$ to $3 \times 10^4$ | $6 \times 10^{-3}$ | | |
| 0.305 | $10^{-9}$ to $3 \times 10^4$ | $10 \times 10^{-3}$ | | |
| 0.306 | $10^{-9}$ to $3 \times 10^4$ | $16 \times 10^{-3}$ | | |
| 0.307 | $10^{-9}$ to $3 \times 10^4$ | $25 \times 10^{-3}$ | | |
| 0.308 | $10^{-9}$ to $3 \times 10^4$ | $40 \times 10^{-3}$ | | or 0.56 $t^{0.25}$ whichever is lower. |
| 0.309 | $10^{-9}$ to $3 \times 10^4$ | $63 \times 10^{-3}$ | | (See Tables 8 and 9 |
| 0.310 | $10^{-9}$ to $3 \times 10^4$ | 0.1 | | for limiting apertures) |
| 0.311 | $10^{-9}$ to $3 \times 10^4$ | 0.16 | | |
| 0.312 | $10^{-9}$ to $3 \times 10^4$ | 0.25 | | |
| 0.313 | $10^{-9}$ to $3 \times 10^4$ | 0.40 | | |
| 0.314 | $10^{-9}$ to $3 \times 10^4$ | 0.63 | | |
| 0.315 to 0.400 | $10^{-9}$ to 10 | 0.56 $t^{0.25}$ | | |
| 0.315 to 0.400 | 10 to $3 \times 10^4$ | 1.0 | | |
| Visible and Near Infrared | | | | |
| 0.400 to 0.700 | $10^{-13}$ to $10^{-11}$ | $1.5 \times 10^{-5}$ | | |
| 0.400 to 0.700 | $10^{-11}$ to $10^{-9}$ | $2.7\, t^{0.75}$ | | |
| 0.400 to 0.700 | $10^{-9}$ to $18 \times 10^{-6}$ | $5.0 \times 10^{-7}$ | | |
| 0.400 to 0.700 | $18 \times 10^{-6}$ to 10 | $1.8\, t^{0.75} \times 10^{-3}$ | | |
| 0.400 to 0.450 | 10 to 100 | $1 \times 10^{-2}$ | | |
| 0.450 to 0.500 | 10 to $T_1$ | | $1 \times 10^{-3}$ | |
| 0.450 to 0.500 | $T_1$ to 100 | $C_a \times 10^{-2}$ | | |
| 0.400 to 0.500 | 100 to $3 \times 10^4$ | | $C_a \times 10^{-4}$ | (See Tables 8 and 9 |
| 0.500 to 0.700 | 10 to $3 \times 10^4$ | | $1 \times 10^{-3}$ | for limiting apertures) |
| 0.700 to 1.050 | $10^{-13}$ to $10^{-11}$ | $1.5\, C_A \times 10^{-8}$ | | For multiple pulses |
| 0.700 to 1.050 | $10^{-11}$ to $10^{-9}$ | $2.7\, C_A\, t^{0.75}$ | | apply correction factor |
| 0.700 to 1.050 | $10^{-9}$ to $18 \times 10^{-6}$ | $5.0\, C_A \times 10^{-7}$ | | $C_p$ given in Table 6. |
| 0.700 to 1.050 | $18 \times 10^{-6}$ to 10 | $1.8\, C_A\, t^{0.75} \times 10^{-3}$ | | |
| 0.700 to 1.050 | 10 to $3 \times 10^4$ | | $C_A \times 10^{-3}$ | |
| 1.050 to 1.400 | $10^{-13}$ to $10^{-11}$ | $1.5\, C_C \times 10^{-7}$ | | |
| 1.050 to 1.400 | $10^{-11}$ to $10^{-9}$ | $27.0\, C_C\, t^{0.75}$ | | |
| 1.050 to 1.400 | $10^{-9}$ to $50 \times 10^{-6}$ | $5.0\, C_C \times 10^{-6}$ | | |
| 1.050 to 1.400 | $50 \times 10^{-6}$ to 10 | $9.0\, C_C\, t^{0.75} \times 10^{-3}$ | | |
| 1.050 to 1.400 | 10 to $3 \times 10^4$ | | $5.0\, C_C \times 10^{-3}$ | |
| Far Infrared | | | | |
| 1.400 to 1.500 | $10^{-9}$ to $10^{-3}$ | 0.1 | | |
| 1.400 to 1.500 | $10^{-3}$ to 10 | 0.56 $t^{0.25}$ | | |
| 1.400 to 1.500 | 10 to $3 \times 10^4$ | | 0.1 | |
| 1.500 to 1.800 | $10^{-9}$ to 10 | 1.0 | | For multiple pulses |
| 1.500 to 1.800 | 10 to $3 \times 10^4$ | | 0.1 | apply correction factor |
| 1.800 to 2.600 | $10^{-9}$ to $10^{-3}$ | 0.1 | | $C_p$ given in Table 6 |
| 1.800 to 2.600 | $10^{-3}$ to 10 | 0.56 $t^{0.25}$ | | (See Tables 8 and 9 for |
| 1.800 to 2.600 | 10 to $3 \times 10^4$ | | 0.1 | limiting apertures) |
| 2.600 to $10^3$ | $10^{-9}$ to $10^{-7}$ | $1 \times 10^{-2}$ | | |
| 2.600 to $10^3$ | $10^{-7}$ to 10 | 0.56 $t^{0.25}$ | | |
| 2.600 to $10^3$ | 10 to $3 \times 10^4$ | | 0.1 | |

[†] See Table 6 and FIGS. 8 and 9 for correction factors $C_A$, $C_a$ and time $T_1$. For exposure durations greater than 10 seconds and extended sources in the retinal hazard region (0.400 to 1.4 μm), see Table 5b.

Notes:
1. For repeated (pulsed) exposures, see Section 8.2.3.
2. The wavelength region $\lambda_1$ to $\lambda_2$ means $\lambda_1 \leq \lambda < \lambda_2$, e.g., 0.180 to 0.302 μm means $0.180 \leq \lambda < 0.302$ μm.
3. Dual Limit Application: In the Dual Limit Wavelength Region (0.400 to 0.600 μm), the listed MPE is the lower value of the photochemical and thermal MPEs as determined by $T_1$.

TABLE 5b

APPENDIX 2
Maximum Permissible Exposure (MPE) for Extended-Source Ocular Exposure
to a Laser Beam for Long Exposure Durations[†]

| Wavelength (μm) | Exposure Duration; t (s) | MPE (J · cm⁻²) except as noted | MPE (W · cm⁻²) except as noted | Notes |
|---|---|---|---|---|
| Visible | | | | |
| 0.400 to 0.700 | $10^{-13}$ to $10^{-11}$ | $1.5\ C_E \times 10^{-8}$ | | (See Tables 8 and 9 for limiting apertures) |
| 0.400 to 0.700 | $10^{-11}$ to $10^{-9}$ | $2.7\ C_E\ t^{0.75}$ | | |
| 0.400 to 0.700 | $10^{-9}$ to $18 \times 10^{-6}$ | $5.0\ C_E \times 10^{-7}$ | | |
| 0.400 to 0.700 | $18 \times 10^{-6}$ to 0.7 | $1.8\ C_E\ t^{0.75} \times 10^{-3}$ | | |

Dual Limits for 400–600 nm visible laser exposure for t > 0.7 s

Photochemical
   For α ≤ 11 mrad, the MPE is expressed as irradiance and radiant exposure*

| | | | | |
|---|---|---|---|---|
| 0.400 to 0.600 | 0.7 to 100 | $C_B \times 10^{-2}$ | | (See Tables 8 and 9 for limiting apertures) (See Table 8 for limiting cone angle γ) |
| 0.400 to 0.600 | 100 to $3 \times 10^4$ | | $C_B \times 10^{-4}$ | |

For α > 11 mrad, the MPE is expressed as radiance and integrated radiance*

| | | | | |
|---|---|---|---|---|
| 0.400 to 0.600 | 0.7 to $1 \times 10^4$ | $100\ C_B$ J-cm-2 · sr⁻¹ | | |
| 0.400 to 0.600 | $1 \times 10^4$ to $3 \times 10^4$ | | $C_B \times 10^{-2}$ W-cm⁻² · sr⁻¹ | | and

Thermal

| | | | | |
|---|---|---|---|---|
| 0.400 to 0.700 | 0.7 to $T_2$ | $1.8\ C_E t^{0.75} \times 10^{-3}$ | | |
| 0.400 to 0.700 | $T_2$ to $3 \times 10^4$ | | $1.8\ C_E T_2^{-0.25} \times 10^{-3}$ | |

| Wavelength (μm) | Exposure Duration; t (s) | MPE (J · cm⁻²) except as noted | MPE (W · cm⁻²) except as noted | Notes |
|---|---|---|---|---|
| Near Infrared | | | | |
| 0.700 to 1.050 | $10^{-13}$ to $10^{-11}$ | $1.5\ C_A\ C_E \times 10^{-8}$ | | (See Tables 8 and 9 for limiting apertures) |
| 0.700 to 1.050 | $10^{-11}$ to $10^{-9}$ | $2.7\ C_A\ C_E\ t^{0.75}$ | | |
| 0.700 to 1.050 | $10^{-9}$ to $18 \times 10^{-6}$ | $5.0\ C_A\ C_E \times 10^{-7}$ | | |
| 0.700 to 1.050 | $18 \times 10^{-6}$ to $T_2$ | $1.8\ C_A\ C_E\ t^{0.75} \times 10^{-3}$ | | |
| 0.700 to 1.050 | $T_2$ to $3 \times 10^4$ | | $1.8\ C_A\ C_E\ T_2^{-0.25} \times 10^{-3}$ | |
| 1.050 to 1.400 | $10^{-13}$ to $10^{-11}$ | $1.5\ C_C\ C_E \times 10^{-7}$ | | |
| 1.050 to 1.400 | $10^{-11}$ to $10^{-9}$ | $27.0\ C_C\ C_E\ t^{0.75}$ | | |
| 1.050 to 1.400 | $10^{-9}$ to $50 \times 10^{-6}$ | $5.0\ C_C\ C_E \times 10^{-6}$ | | |
| 1.050 to 1.400 | $50 \times 10^{-6}$ to $T_2$ | $9.0\ C_C\ C_E\ t^{0.75} \times 10^{-3}$ | | |
| 1.050 to 1.400 | $T_2$ to $3 \times 10^4$ | | $9.0\ C_C\ C_E\ T_2^{-0.25} \times 10^{-3}$ | |

[†]See Table 6 and FIGS. 8, 9 and 11 for correction factors $C_A$, $C_B$, $C_C$, $C_E$, $C_F$, and time $T_2$.
*For sources subtending an angle greater than 11 mrad, the limit may also be expressed as an integrated radiance $L_P = 100\ C_S$ J · cm⁻² · sr⁻¹ for $0.7\ s \leq t < 10^4$ s and $L_T = C_B \times 10^{-2}$ W · cm⁻² · sr⁻¹ for $t \geq 10^4$ s as measured through a limiting cone angle γ. These correspond to values of J · cm⁻² for 10 s ≤ t < 100 s and W · cm⁻² for t ≥ 100 s as measured through a limiting cone angle γ.
γ = 11 mrad for 0.7 s ≤ t < 100 s,
γ = 1.1 × $t^{0.5}$ mrad for 100 s ≤ t < $10^4$ s
γ = 110 mrad for $10^4$ s ≤ t < $3 \times 10^4$ s
See FIG. 3 for γ and Appendix B7.2 for examples.
Notes:
1. For repeated (pulsed) exposures, see Section 8.2.3.
2. The wavelength region $\lambda_1$ to $\lambda_2$ means $\lambda_1 \leq \lambda < \lambda_2$, e.g., 1.180 to 1.302 μm means 1.180 ≤ λ < 1.302 μm.
3. Dual Limit Application: In the Dual Limit wavelength region (0.400 to 0.600 μm), the exposure limit is the lower value of the determined photochemical and thermal exposure limit.

The invention claimed is:

1. A method of transmitting data in a wireless power transmission system comprising a power transmitter which comprises a first light source, means for directing light emitted by the first light source in a desired direction, and at least one power receiver which comprises a first photo-detector for receiving the emitted light and for converting it into electric current, the method comprising:

transmitting, by a second light source included in the power transmitter, substantially parallelly and as pulses, light arranged around the light emitted by the first light source, the intensity of the pulses being substantially lower than the intensity of the light emitted by the first light source and data bits being encoded in the pulses so as to determine a maximum time interval between two successive pulses, indicating, by a second photo-detector included in the power receiver, light pulses emitted by the second light source, determining data included in the light pulses and time between successive received light pulses, and transmitting a control signal indicating disturbance-free reception of data from the power receiver to the power transmitter in response to the time between successive received light pulses not exceeding the maximum time interval determined for two successive pulses.

2. The method of claim 1, further comprising:

transmitting the control signal indicating the reception of the light pulses emitted by the second light source from the power receiver to the power transmitter at regular intervals, stopping the transmission of the control signal in response to detecting a disturbance in the light pulses emitted by the second light source.

3. The method of claim 1, wherein the second light source comprises a plural number of separate light sources arranged substantially circularly around the first light source.

4. The method of claim 3, further comprising:
indicating, by the power receiver, the light pulses emitted by the plurality of separate light sources as logical binary values, and
stopping the transmission of the control signal in response to the binary value of a light pulse emitted by at least one of the separate light sources deviating from the simultaneous binary values of other light pulses.

5. The method of claim 1, further comprising:
activating, in response to the control signal received by the power transmitter, the first light source of the power transmitter in order to transmit power to the power receiver.

6. The method of claim 1, further comprising:
transmitting the light of the first light source at a wavelength and at a power density that enable a brief ocular exposure.

7. A wireless power transmission system comprising:
a power transmitter which comprises a first light source and means for directing light emitted by the first light source in a desired direction, and at least one power receiver which comprises a first photo-detector for receiving the emitted light and for converting it into electric current, a second light source emitting light pulses of a substantially lower intensity than the intensity of light pulses emitted by the first light source, the pulses being arranged to be transmitted substantially parallelly around the light emitted by the first light source and data bits being encoded in the pulses so as to determine a maximum time interval between two successive pulses; and
at least one power receiver which comprises a first photo-detector for receiving the emitted light and for converting it into electric current, a second photo-detector for indicating light pulses emitted by the second light source, means for determining data included in the light pulses and time between successive received light pulses, and transmitting means responsive to the determination, arranged to transmit a control signal to the power transmitter in response to the time between successive received light pulses not exceeding the maximum time interval determined for two successive pulses.

8. The power transmission system of claim 7, wherein the power receiver is arranged to transmit the control signal to the power transmitter at regular intervals from the reception of the light emitted by the second light source and, in response to detecting a disturbance in the light emitted by the second light source, to stop the transmission of the control signal.

9. The power transmission system of claim 7, wherein the second light source comprises a plural number of separate light sources arranged substantially circularly around the first light source.

10. The power transmission system of claim 9, wherein the power receiver is arranged to indicate the light pulses emitted by the plurality of separate light sources as logical binary values, whereby
the power receiver is arranged to stop the transmission of the control signal in response to the binary value of a light pulse emitted by at least one of the separate light sources deviating from the simultaneous binary values of other light pulses.

11. The power transmission system of claim 7, wherein the power transmitter is arranged to activate the first light source of the power transmitter in order to transmit power to the power receiver in response to the control signal received by the power transmitter.

12. The power transmission system of claim 7, wherein the power transmitter is arranged to transmit the light of the first light source at a wavelength and at a power density that enable a brief ocular exposure.

* * * * *